United States Patent [19]

Iida

[11] Patent Number: 4,520,399
[45] Date of Patent: May 28, 1985

[54] PICTURE INFORMATION DISPLAY DEVICE

[75] Inventor: Kazuhiko Iida, Yokohama, Japan

[73] Assignee: Tokyo Shibaura Kenki Kabushiki Kaisha, Kawasaki, Japan

[21] Appl. No.: 458,877

[22] Filed: Jan. 18, 1983

[30] Foreign Application Priority Data

Jan. 29, 1982 [JP] Japan .................................. 57-13166
Jan. 29, 1982 [JP] Japan .................................. 57-13167

[51] Int. Cl.³ ........................ H04N 1/04; H04N 1/40
[52] U.S. Cl. ..................................... 358/287; 358/280
[58] Field of Search ............... 358/256, 280, 284, 287, 358/77, 903

[56] References Cited

U.S. PATENT DOCUMENTS 4,275,450  6/1981  Potter ................................... 358/287
4,280,143  9/1981  Judd et al. ............................ 358/260
4,303,948  9/1981  Arai et al. ............................ 358/287
4,342,052  7/1982  Rackley et al. ...................... 358/287
4,398,222  8/1983  Ogawa ................................. 358/287

Primary Examiner—Howard W. Britton
Assistant Examiner—John K. Peng
Attorney, Agent, or Firm—Cushman, Darby & Cushman

[57] ABSTRACT

A picture information display having a control circuit for determining a reductive ratio which is set in a size converting circuit in accordance with the size of an orginal and the size of a display area at a display unit. The size converting circuit reduces the size of the picture information read out from a page buffer memory of the control circuit in accordance with the reductive ratio. The readout picture information is stored in a refresh memory of a display interface. The display unit displays the size-reduced picture information of the refresh memory. The reductive ratio is so selected that the picture information stored in the refresh memory is displayed over the entire region of a display area of the display unit.

9 Claims, 51 Drawing Figures (A)

(B)

(C)

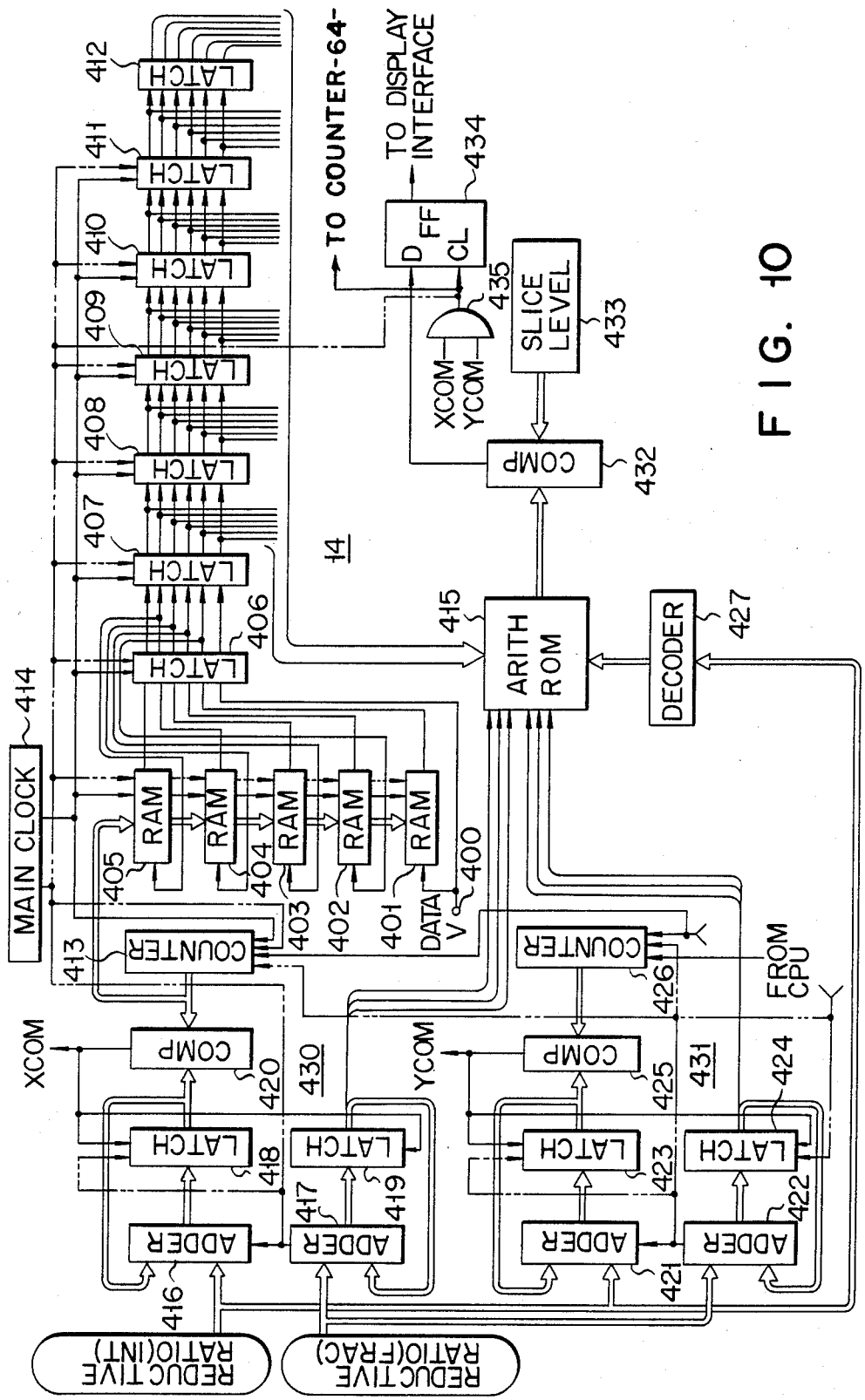
F I G. 10

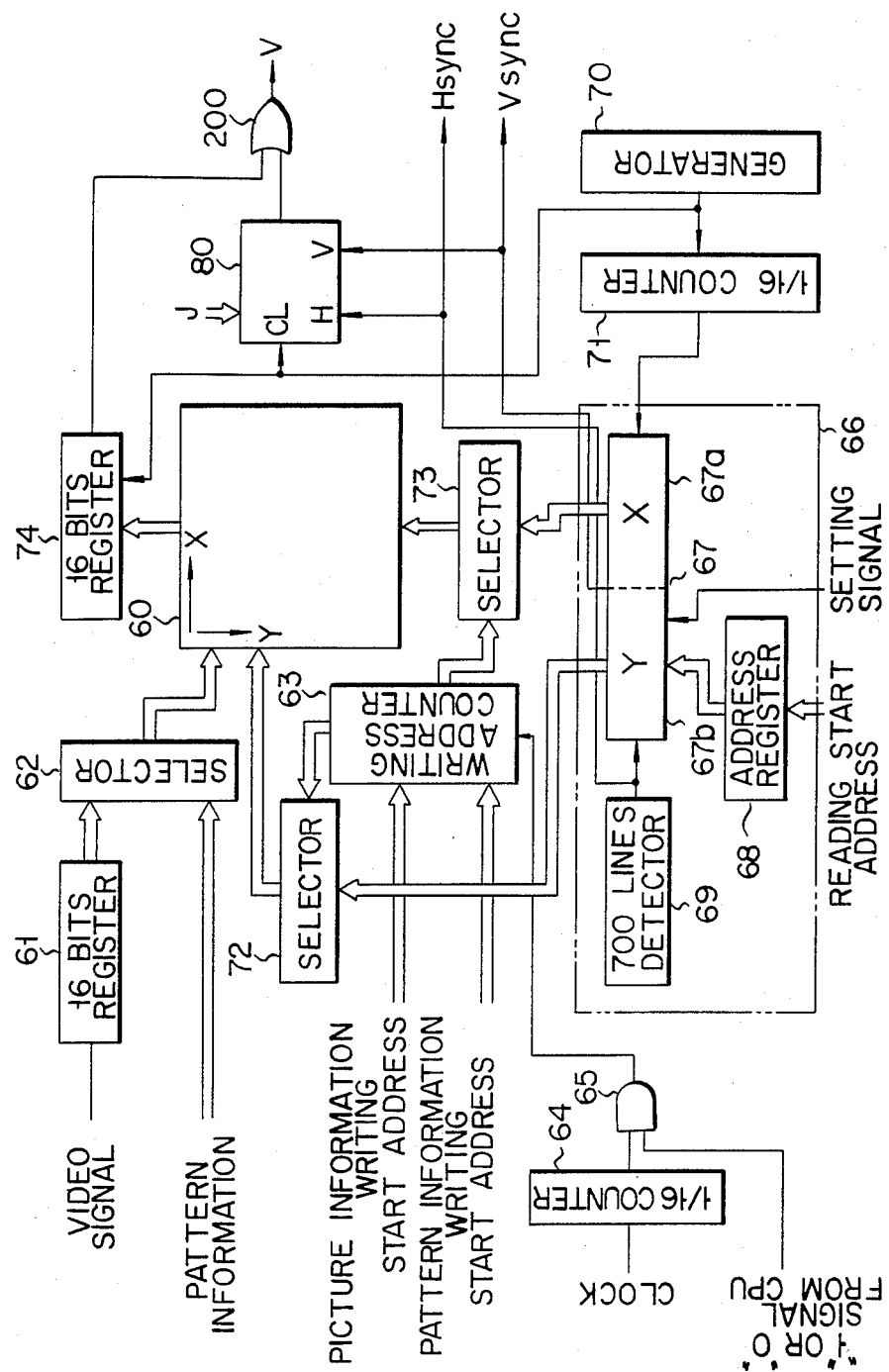
F I G. 13

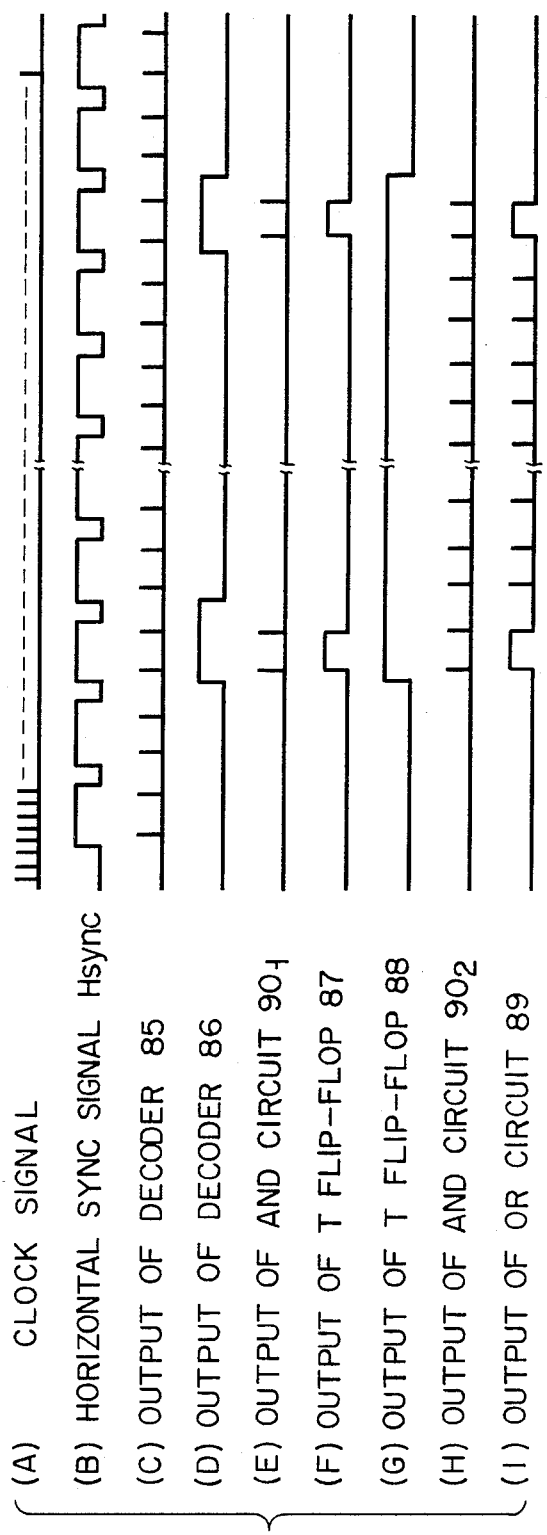

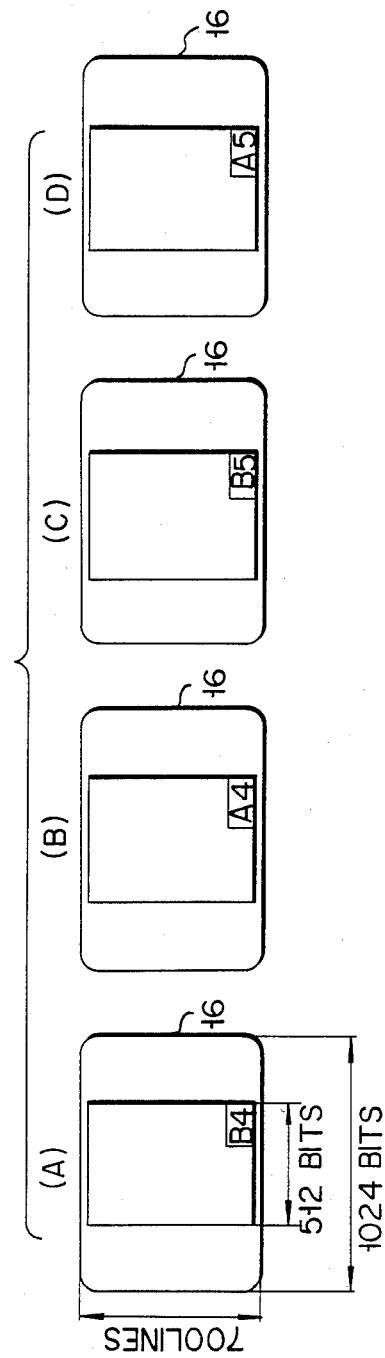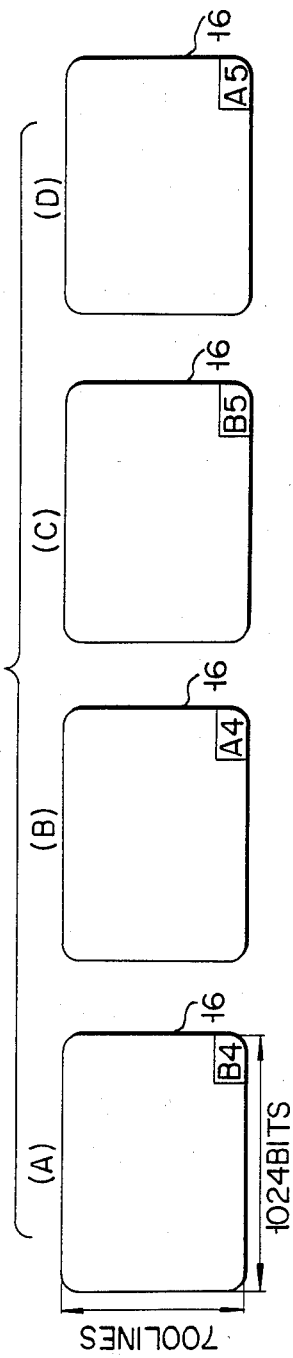

PICTURE INFORMATION DISPLAY DEVICE

BACKGROUND OF THE INVENTION

The present invention relates to a picture information display device of a picture information storage/retrieval apparatus and, more particularly, to a picture information display device in which a display area of the display unit is effectively used and display operation for displaying picture information is simplified.

A picture information storage/retrieval apparatus has been recently developed and made commercially available in which picture information on documents in offices is scanned by two-dimensional scanning and such picture information is stored in a storage unit such as an optical disk unit, and in which desired picture information is retrieved as needed and is printed by a hard copying unit.

In the picture information storage/retrieval apparatus of the type described above, the retrieval speed differs from the storage speed, so that picture information corresponding to the unit amount (page information) is temporarily stored in a page buffer memory. The picture information in the page buffer memory is monitored on a picture information display unit which comprises a display interface, a CRT display and the like.

The page buffer memory has a memory area corresponding to 2048 bits×2800 lines, as shown in FIG. 1. However, since the refresh memory only has a memory area corresponding to 1024 bits×700 lines, all picture information cannot be displayed at the CRT display at once.

In a conventional apparatus, a size converting circuit is arranged in the display interface. The picture information read out from the page buffer memory is compressed by ¼. The compressed picture information is then stored in the refresh memory so as to display all the picture information at the CRT display at once.

However, in this case, the reductive ratio is fixed regardless of the size of picture information. The size of picture information displayed at the CRT display cannot actually be standardized. As a result, the display area cannot be effectively utilized. When the picture information includes small characters, these characters can often not be recognized on the CRT display screen, thus degrading resolution of the picture image.

In order to solve the above problems, a cursor function is provided in the display interface in addition to the size converting circuit. As shown in FIG. 2B, the size of picture information is reduced to ¼ and is temporarily displayed at the CRT display. Picture information corresponding to a cursor S (frame indicated by the alternate long and short dashed line) as a zoom-up area provided on the CRT display screen is read out from the page buffer memory and is reduced to ½. The reduced picture information is then stored in the refresh memory. As shown in FIG. 2C, half of the picture information can be displayed. This arrangement improves the resolution as compared with the ¼ reduction of picture information.

However, in this case, if the retrieval rate from the page buffer memory is defined as 6 Mbits/sec, the picture information corresponding to the cursor S is displayed in 0.43 sec ($\approx 2048 \times 1400/6 \times 10^6$), thus resulting in a slow display speed.

SUMMARY OF THE INVENTION

It is an object of the present invention to provide a picture information display device which effectively utilizes a display area of the display unit.

It is another object of the present invention to provide a picture information display device in which the display operation of picture information is simplified.

It is still another object of the present invention to provide a picture information display device in which the resolution of a picture image and the display speed of picture information are improved.

The picture information on the original is scanned and the size of the original is detected by the picture information scanning device. The readout picture information is stored in a page buffer memory of a control circuit. The control circuit determines the reductive ratio of the picture information in accordance with a comparison between the size of the original and the size of the display area of the display unit. The control circuit causes a size converting circuit to set a predetermined reductive size therein. The size converting circuit reduces the picture information stored in the page buffer memory in accordance with the predetermined reductive ratio and stores it in a refresh memory of a display interface means. A value is selected as the predetermined reductive ratio to display the picture information substantially over the entire display area at the display unit. The display unit displays the picture information stored in the refresh memory over the entire display area.

The entire display area of the display unit can be effectively utilized according to the present invention and because the picture image is always displayed at a constant size over the entire display area, the resolution of the picture image is improved significantly.

According to an embodiment of the present invention, a given area of the refresh memory and a zoom-up area at an arbitrary position of the given area are movably designated by a special means, so that the display operation of the picture information can be effectively performed. Specifically, in order to display the picture information in the designated area and renew or update the picture image displayed on the screen, movable designation of the given area or movable designation of the zoom-up area is selectively performed in accordance with the relationship between the memory area of the refresh memory and a given area designated within the memory area.

According to the present invention, the display operation of the picture information can be simplified. Furthermore, since the display unit reads out the picture information from the refresh memory, the picture information need not be read out from the page buffer memory unlike in the conventional device, thus increasing the display speed.

BRIEF DESCRIPTION OF THE DRAWINGS

By way of example and to make the description clearer, reference is made to the accompanying drawings, in which:

FIG. 10 is a block diagram showing the arrangement of the size converting circuit shown in FIG. 3;

FIG. 13 is a block diagram showing an arrangement of a display interface shown in FIG. 3;

FIGS. 15A to 15I are timing charts for explaining the mode of operation of the cursor locating circuit shown in FIG. 14;

FIGS. 18A to 18D and FIGS. 19A to 19D are views for explaining the display operation of the picture information display device according to the embodiment of the present invention;

DETAILED DESCRIPTION OF THE PREFERRED EMBODIMENT

Figure 1:
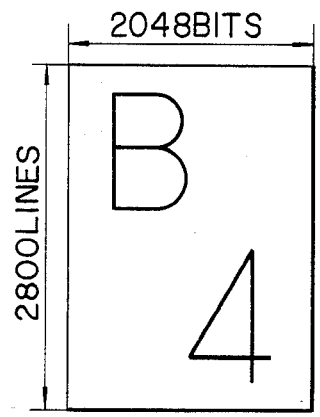
FIG. 1 is a representation of a memory area of a page buffer memory.
Figure 2:
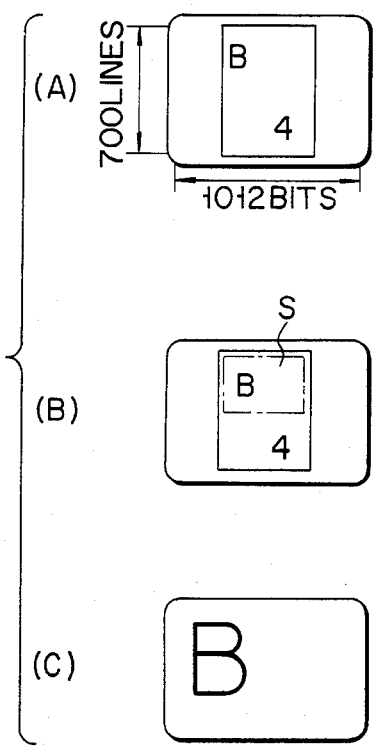
FIGS. 2A to 2C are views for explaining the display conditions of picture information displayed at a display unit.
Figure 3:
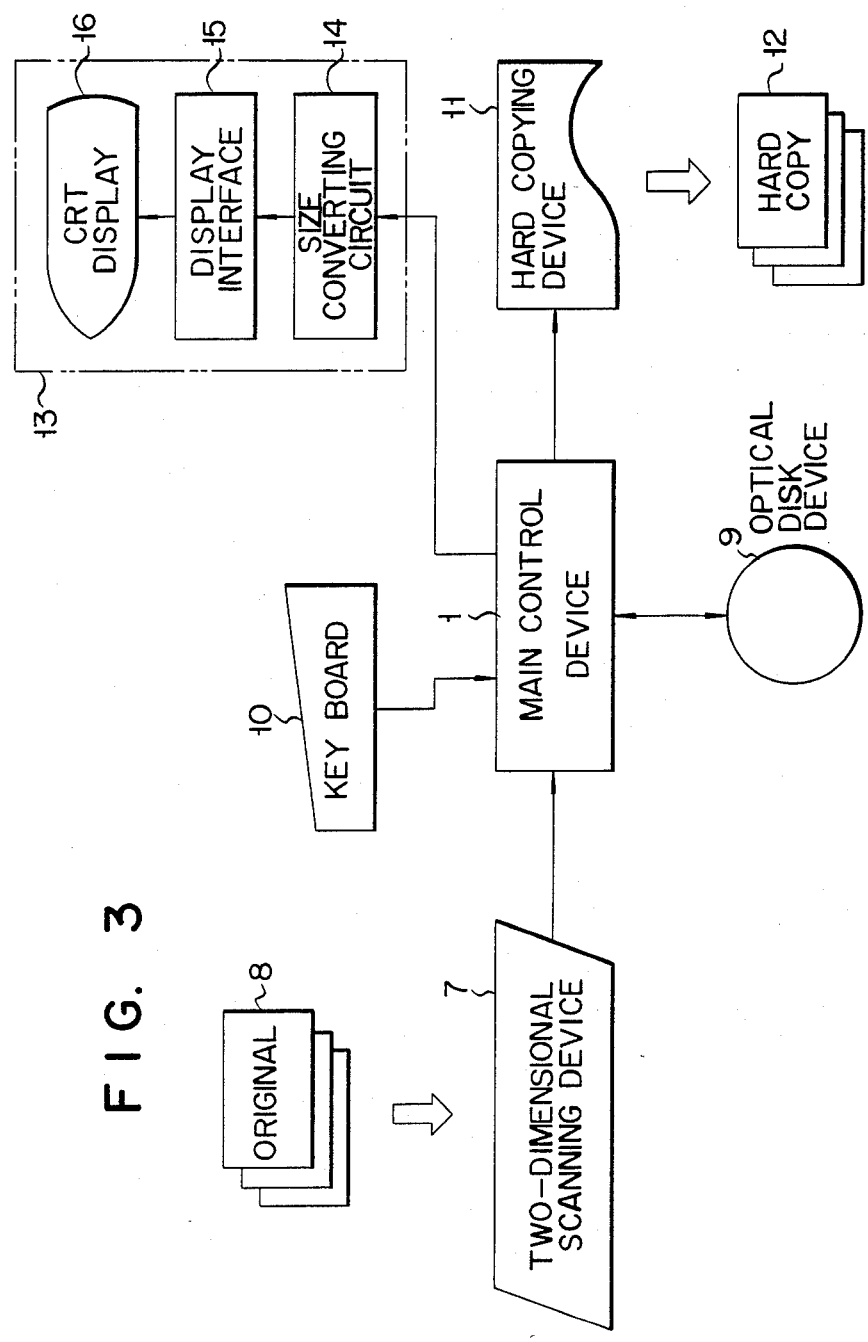
FIG. 3 shows a schematic arrangement of a picture information display device applied to a picture information storage/retrieval apparatus according to an embodiment of the present invention.
Figure 4:
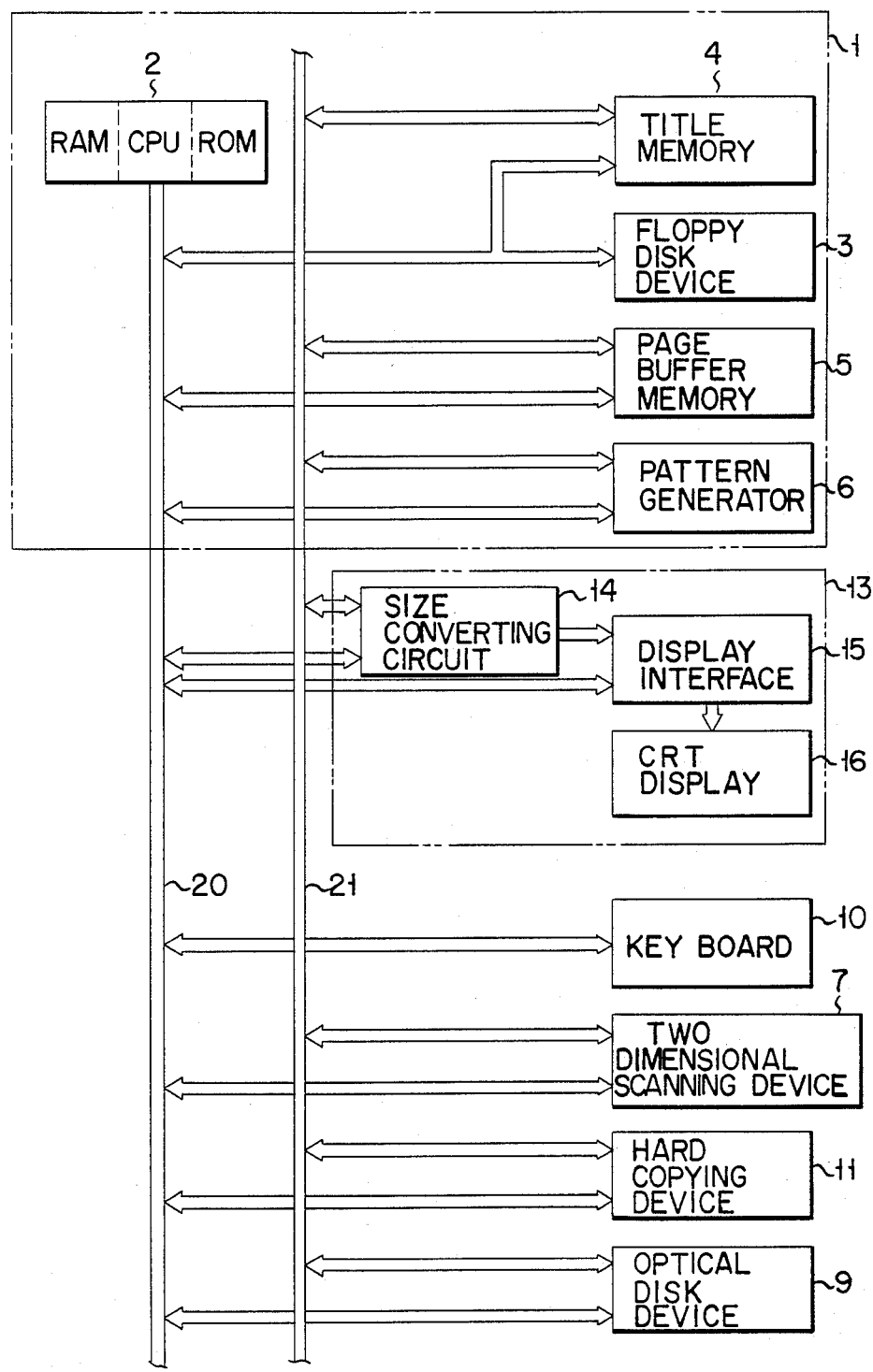
FIG. 4 is a schematic block diagram of the picture information display device shown in FIG. 3.

FIGS. 3 and 4 are block diagrams schematically showing a picture information display device applied to a picture information storage/retrieval apparatus according to an embodiment of the present invention. Referring to FIGS. 3 and 4, a main control device 1 comprises: a CPU 2 for performing various control operations; a picture information storage/retrieval apparatus such as a floppy disk device 3 which stores control information for controlling various file sets (set of optical disks) and various files (optical disks); a title memory 4 for temporarily storing title information read out from an optical disk device 9 to be described later; a page buffer memory 5 which has a memory area (2048 bits×2800 lines) corresponding to at least one unit picture information (one page); and a pattern generator 6 for storing pattern information such as characters and signs. A two-dimensional scanning device 7 scans an original (document) 8 to obtain a video signal corresponding to picture information on the original 8. The optical disk device 9, as a largecapacity storage device, sequentially stores picture information scanned by the two-dimensional scanning device 7 and picture information created by the main control device 1 in a memory area for the optical disk. A keyboard 10 is used to enter titles for individual picture information and various operating instructions. A hard copying device 11 produces a hard copy 12 of picture information scanned by the two-dimensional scanning device 7 or picture information read out from the optical disk device 9. A picture display device 13 is an output device which comprises a size converting circuit 14, a display interface 15 and a cathode-ray tube display (to be referred to as a CRT display hereinafter) 16. The picture display device 13 displays picture information scanned by the two-dimensional scanning device 7 or picture information read out from the optical disk device 9.

Referring to FIG. 4, the CPU 2 is connected, through a data bus 20, to the floppy disk device 3, the title memory 4, the page buffer memory 5, the pattern generator 6, the two-dimensional scanning device 7, the optical disk device 9, the keyboard 10, the hard copying device 11, the size converting circuit 14, and the display interface 15. An image bus 21 is connected to the title memory 4, the page buffer memory 5, the pattern generator 6, the two-dimensional scanning device 7, the optical disk device 9, the hard copying device 11, the size converting circuit 14, and the display interface 15 so as to allow exchange of data therebetween.

Figure 5:
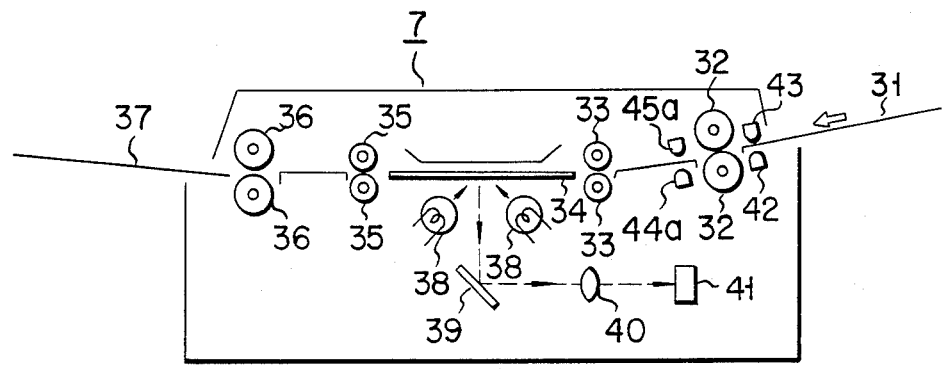
FIG. 5 shows a schematic arrangement of a two-dimensional scanning device shown in FIG. 3.

FIG. 5 shows the two-dimensional scanning device 7 in detail. An original placed on a paper feed tray 31 is fed by pickup rollers 32 in the main housing of the two-dimensional scanning device 7. The original is conveyed onto an original (or document) table 34 by means of conveyor rollers 33. The original on the original table 34 is then discharged onto discharge trays 37 by means of conveyor rollers 35 and discharge rollers 36. A pair of exposure lamps 38 are disposed under the original table 34. Light from the exposure lamps 38 is projected on the original 8. Reflected light from the original 8 is incident on a CCD line sensor 41 through a mirror 39 and a projection lens 40. The line sensor 41 produces a video signal corresponding to picture information on the original. A photocoupler having a light-emitting diode 42 and a phototransistor 43 is arranged in the vicinity of the pickup rollers 32 to detect the original to be fed. Another photocoupler having light-emitting diodes 44a, 44b, 44c and 44d and phototransistors 45a, 45b, 45c and 45d is also disposed in the vicinity of the pickup rollers 32 to detect the size of the original to be fed.

Figure 6:
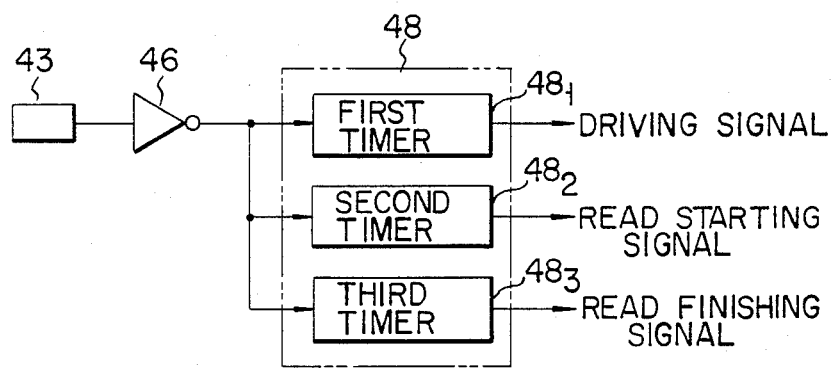
FIG. 6 is a schematic block diagram of an operation control section of the two-dimensional scanning device shown in FIG. 5.

FIG. 6 is a schematic block diagram of a control circuit which is operated by an output from the phototransistor 43. FIGS. 7A to 7D are timing charts for explaining the mode of operation of the control circuit 48.

Figure 7:
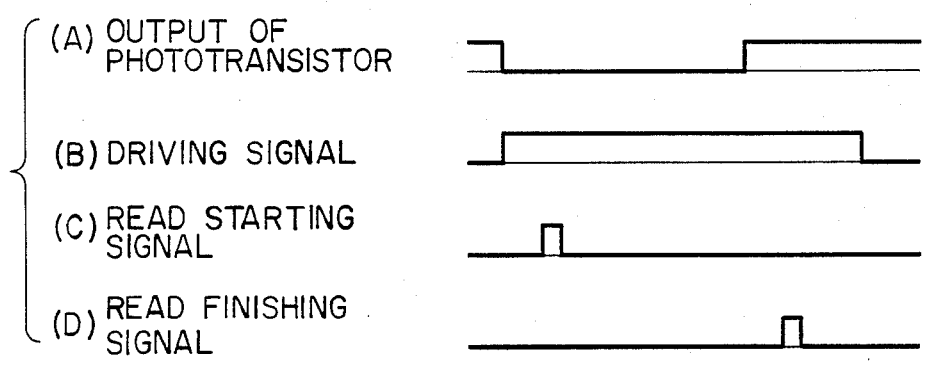
FIGS. 7A to 7D are timing charts for explaining the mode of operation of the control section in FIG. 6.
Figure 8:
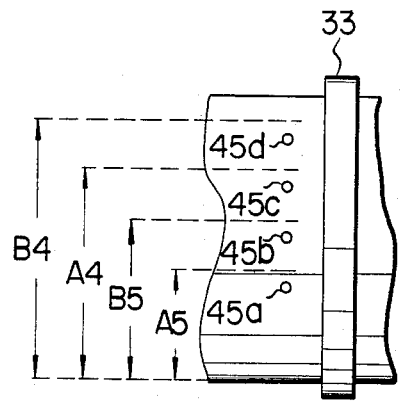
FIG. 8 shows an arrangement of phototransistors shown in FIG. 5.
Figure 9:
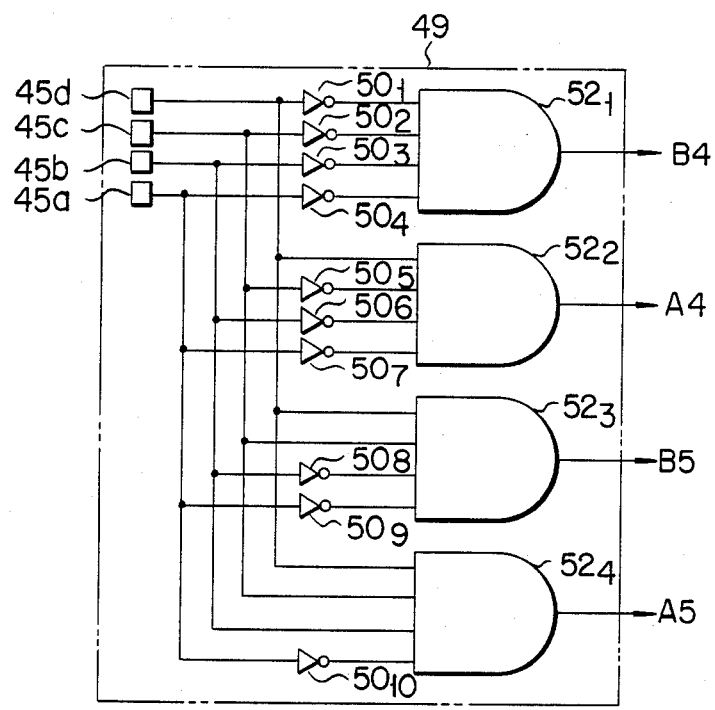
FIG. 9 is a circuit diagram of a size detecting circuit for determining the size of an original in accordance with signals from the phototransistors shown in FIG. 8.

Referring to FIG. 6, the output from the phototransistor 43 is supplied to first, second and third timers $48_1$, $48_2$ and $48_3$ through an inverter 46. When the phototransistor 43 detects the leading end of the original, it produces the output shown in FIG. 7A. As shown in FIG. 7B, the first timer $48_1$ produces a driving signal to drive the pickup and conveyor rollers 32 and 35 and the exposure lamps 38 for a predetermined time interval after the leading end of the original 8 is detected. As shown in FIG. 7C, the second timer $48_2$ produces a read starting signal to operate the line sensor 41 when a predetermined time interval has elapsed after the leading end of the original 8 is detected. As shown in FIG. 7D, the third timer $48_3$ produces a read finishing signal to interrupt operation of the line sensor 41 when a predetermined time interval has elapsed after the leading end of the original 8 is detected. FIG. 8 shows the arrangement of the phototransistors 45a, 45b, 45c and 45d, and FIG. 9 shows the arrangement of a size detecting circuit 49 which receives the detection signals from the phototransistors 45a, 45b 45c and 45d. As shown in FIG. 8, the phototransistors 45a, 45b 45c and 45d which respectively correspond to light-emitting diodes are aligned in the direction perpendicular to the original feed direction and are spaced apart from each other at equal intervals. In accordance with the sizes of originals, the phototransistors 45a 45b 45c and 45d produce different outputs which are respectively decoded to be a B4-size detection signal, an A4-size detection signal, a B5-size detection signal and an A5-size detection signal through inverters $50_1$ to $50_{10}$ and AND gates $52_1$ to $52_4$.

The mode of operation of the circuit described above will be briefly described.

When the operator places the original 8 in the two-dimensional scanning device 7, picture information on the original 8 is sequentially scanned and stored in the page buffer memory 5. At the same time, the size information of the original 8 which is detected by the two-dimensional scanning device 7 is supplied to the CPU 2 and is stored in the RAM therein. When the pieces of picture information which correspond to one page are stored in the page buffer memory 5, the CPU 2 reads out data of size conversion ratio (reductive ratio) corresponding to the detected original size information, and the readout data is then set in the size converting circuit 14. The picture information in the page buffer memory 5 is reduced to a predetermined size by the size converting circuit 14 and is then stored in the refresh memory in the display interface 15. The picture information in the refresh memory is displayed at the CRT display 16.

When the picture information is read out from the optical disk device 9, it is sequentially stored in the page buffer memory 5. At the same time, the original size information already included in the index information corresponding to the readout picture information is supplied to the CPU 2 and is stored in the RAM therein. When the pieces of picture information which correspond to one page are stored in the page buffer memory 5, the CPU 2 reads out size conversion ratio data (reductive ratio) corresponding to the original size of the information stored. The size conversion ratio data is then set in the size converting circuit 14. The picture information in the page buffer memory 5 is reduced to a predetermined size by the size converting circuit 14 and is then stored in the refresh memory in the display interface 15. The picture information in the refresh memory is displayed at the CRT display 16.

The size converting circuit 14 and the display interface 15 will be described in detail.

FIG. 10 is a block diagram showing the arrangement of the size converting circuit. The size converting circuit 14 has five RAMs 401 to 405 and seven latch circuits 406 to 412. Each of the RAMs 401 to 405 has a capacity of 2 Kbits. The addresses of the RAMs 401 to 405 are accessed by outputs from a counter 413. Each of the latch circuits 406 to 412 has a capacity of 6 bits. The RAMs 401 to 405 and the latch circuits 406 to 412 are operated in response to a clock pulse from a main clock pulse generator 414 through signal lines indicated by solid lines and the alternate long and two short dashed lines. In this case, the signal lines indicated by the solid lines serve as size reduction circuit lines, whereas the signal lines indicated by the alternate long and two short dashed lines serve as size magnification circuit lines.

The one-line picture information stored in the page buffer memory 5 is supplied to a data input terminal 400. In this case, the one-line picture information comprises 2048 bits. The picture information supplied to the data input terminal 400 is supplied to the RAM 401 and the latch circuit 406. Under the address control by the counter 413, the first line picture information of 2048 bits is supplied to the first RAM 401. When the start bit of the second line picture information of 2048 bits is supplied to the RAM 401, the start bit of the first line picture information is read out and is latched in the latch circuit 406. The start bit of the second line picture information is stored in a first memory location of the RAM 401. The second bit of the second line picture information is stored in the RAM 401, whereas the second bit of the first line picture information is read out and is latched in the latch circuit 406. At the same time, the first bit of the first line picture information which is latched in the latch circuit 406 is read out and stored in the RAM 402. In this manner, when the end bit (2048th bit) of the second line picture information is stored in the RAM 401, the first line picture information of 2048 bits is shifted to the RAM 402. The first line picture information is sequentially shifted to the RAM 401 to the RAM 405. The operation is then repeated in the same manner described above: the pieces of first to fifth line picture information are respectively stored in the RAM 405 to the RAM 401. Simultaneously as the first bits of the pieces of the first to fifth line picture information are latched in the latch circuit 406, the first or start bit of the sixth line picture information which is supplied to the data input terminal 400 is also latched. A set of bits described above are supplied to the latch circuit 407.

Figure 11:
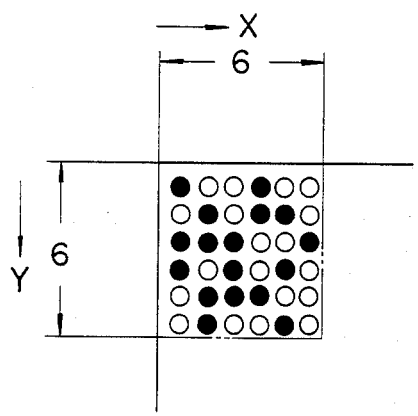
FIGS. 11 and 12 are views for explaining the mode of operation of the size converting circuit shown in FIG. 10.

When the second bit of the sixth line picture information is supplied to the data input terminal 400, the first bits of the pieces of the first to sixth line picture information which are latched in the latch circuit 407 are supplied to the next latch circuit 408. The second bits of pieces of the first to sixth line picture information are latched in the latch circuit 407. Similarly, the latched contents are then shifted to the right in FIG. 10. The seventh bit of the sixth line picture information is supplied to the data input terminal 400, the first bits of the pieces of the first to sixth line information are latched by the latch circuit 412; the second bits thereof are latched by the latch circuit 411; the third bits thereof are latched by the latch circuit 410; the fourth bits thereof are latched by the latch circuit 409; the fifth bits thereof are latched by the latch circuit 408; and the sixth bits thereof are latched by the latch circuit 407. When all the bits latched by the latch circuits 407 to 412 are formed in a matrix array, the original is reproduced in a dot picture image, as shown in FIG. 11. Referring to FIG. 11, a black dot corresponds to bit "1", whereas a white dot corresponds to bit "0". Local pieces of picture information which correspond to 6 bits (X-axis)×6 lines (Y-axis) are latched in the latch circuits 407 to 412, and are supplied to an arithmetic ROM 415.

A distance measuring circuit 430 comprises adders 416 and 417, latch circuits 418 and 419, a comparator 420, and the counter 413 so as to measure a distance along the X-axis. A distance measuring circuit 431 comprises adders 421 and 422, latch circuits 423 and 424, a comparator 425, and a counter 426 so as to measure a distance along the Y-axis. The distance measuring circuits 430 and 431 are used to measure positions of picture dots along the X- and Y-axes in accordance with a predetermined size conversion ratio. Size conversion (magnification or reductive) ratio data along X- and Y-axes is supplied to the adders 416, 417, 421 and 422. FIG. 10 shows an example of reductive ratio data. Data of an integer portion of the reductive ratio is supplied to the adders 416 and 421 and a decoder 427, whereas data of a decimally fractional portion thereof is supplied to the adders 417 and 422. Outputs from the adders 416, 417, 421 and 422 are respectively supplied to the latch circuits 418, 419, 423 and 424. An output from the latch circuit 418 is supplied to one input end of the comparator 420, whereas an output from the latch circuit 423 is supplied to one input end of the comparator 425. Outputs from the latch circuits 418 and 423 are respectively fed back to the inputs of the adders 416 and 421. The counter 413 supplies an output to the other input end of the comparator 420, and the counter 426 supplies an output to the other input end of the comparator 425. Outputs from the latch circuits 419 and 424 are respectively fed back to the input ends of the adders 417 and 422.

Upper three bits of decimally fractional portion output data from the circuit 430 and upper three bits of decimally fractional portion output data from the circuit 431 are respectively read out from the latch circuits 419 and 424 and are supplied as address designation signals to the arithmetic ROM 415. The arithmetic ROM 415 designates the picture dot positions of the size-converted picture image by 64 addresses (in a square formed by four adjacent dots, sides in the X- and Y-axes are respectively divided into eight portions each corresponding to one address, thus forming 64 addresses in a matrix form).

The output data read out from the arithmetic ROM 415 is supplied to one input end of a comparator 432. The other input end of the comparator 432 receives slice level data from a slice level data oscillator 433. When the output data from the arithmetic ROM 415 is larger than the slice level data, the comparator 432 produces a signal of logic level "1". Otherwise, it produces a signal of logic level "0". The signal of logic level "1" or "0" is supplied to a D input end of a flip-flop 434. An output from an AND gate 435 is supplied to a clock input end CL of the flip-flop 434. A coincidence signal XCOM from the comparator 420 is supplied to one input end of the AND gate 435, and a signal YCOM from the comparator 425 is supplied to the other input end of the AND gate 435.

Figure 12:
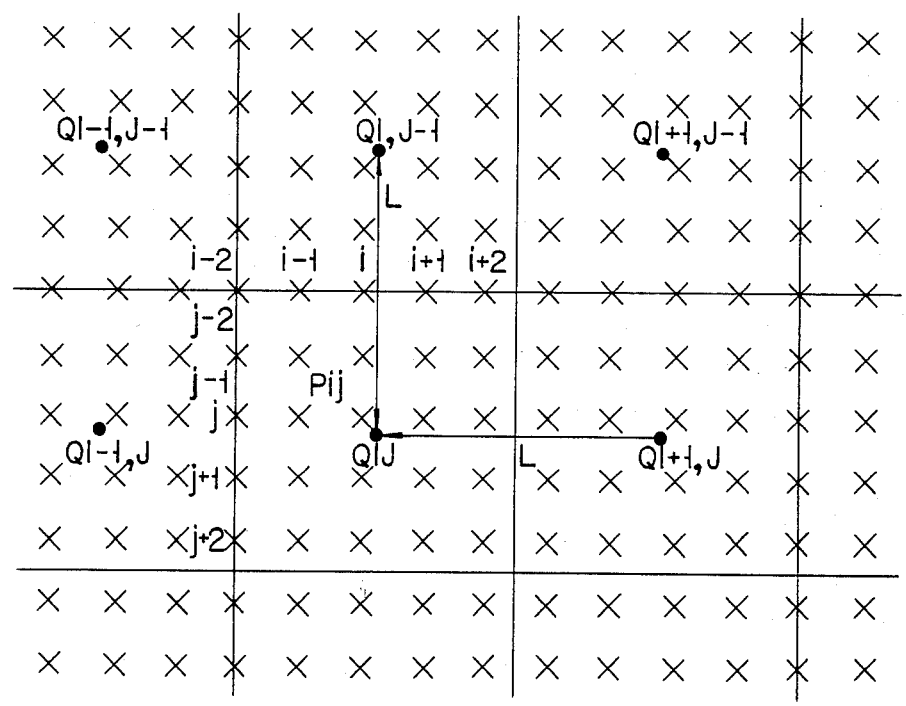

The mode of operation of the size converting circuit 14 having the arrangement described above will be described with reference to FIG. 12. Assume that a reductive ratio specified by the CPU 2 is 1/4.5. Data of an integer portion "4" of the reductive ratio is supplied to adders 416 and 421 in a digital form, and data of a decimally fractional portion "0.5" thereof is supplied to the adders 417 and 422 in a digital form. The picture dot position of the original picture is designated by a symbol X, whereas the picture dot position of the size-converted picture is designated by a black dot, as shown in FIG. 12. The dot at position (i,j) on the original picture image is defined as follows:

$$\{P_{i,j}\} = \left\{ or \begin{matrix} 1 \ldots \text{black dot} \\ 0 \ldots \text{white dot} \end{matrix} \right.$$

The dot at position (I,J) on the size-reduced picture image is defined as follows:

$$\{Q_{I,J}\}$$

The distance between two adjacent dots of the original picture image is defined as 1. A distance between two adjacent dots of the reduced picture image is equal to a reductive ratio $R_r$:

$$L = R_r$$

where constant L is 4.5. When an $L \times L$ area having a central position $(Q_{I,J})$ is designated as S, the average gray level of S is computed on the basis of whether or not the dot position $\{P_{i,j}\}$ belongs to the area S. If the distance between position $(P_{i,j})$ and position $(Q_{I,J})$ is defined as $r_{i,j}$, weighting factor $a_{i,j}$ is determined to be inversely proportional to distance $r_{i,j}$. When $a_{i,j}$ is given as 1 at position $(Q_{I,J})$ and as 0.5 at a position spaced apart by a distance of L/2 from position $(Q_{I,J})$, factor $a_{i,j}$ is expressed as follows:

$$a_{i,j} = 1 - \{0.5/(L/2)\}r_{i,j}1 - r_{i,j}/L$$

Average gray level $\phi_{I,J}$ is given by the following equation:

$$\phi_{I,J} = (\Sigma a_{i,j} \cdot P_{i,j})/\Sigma a_{i,j}(P_{i,j} \leftarrow S)$$

The dot $Q_{I,J}$ of the converted picture image is given as follows:

$$Q_{I,J} = \left\{ or \begin{matrix} 1 \ldots \phi_{I,J} > \theta \\ 0 \ldots \phi_{I,J} < \theta \end{matrix} \right.$$

As may be apparent from the above relation, the dot $Q_{I,J}$ can be obtained by using a predetermined slice level $\theta$.

Data of the integer portion "4" of the reductive ratio from the CPU 2 is supplied to the latch circuit 418 through the adder 416. When the count of the counter 413 reaches 4, the comparator 420 produces the coincidence signal XCOM which is then supplied to the latch circuits 418 and 419 and the AND gate 435. Data of the decimally fractional portion "0.5" is latched in the latch circuit 419 through the adder 417. When the coincidence signal XCOM is supplied to the latch circuits 418 and 419, an arithmetic operation (0.5+0.5=1) is performed by the adder 417. Data of "1" as end-around carry is supplied to the adder 416. An arithmetic operation (4+4+1=9) is performed by the adder 416. An updated content "9" is latched in the latch circuit 418. When the count of the counter 413 reaches "9", the comparator 420 produces the coincidence signal XCOM. Data of "13 (=9+4)" is latched in the latch circuit 418. The coincidence signal XCOM is produced when the count of the counter 413 reaches "13". At the same time, an arithmetic operation (13+4+1) is performed by the adder 416, and an updated content "18" is set in the latch circuit 418.

Every time the contents of the counter 413 reach "4, 9, 13, 18, 22, 27, . . .", the comparator 420 produces the coincidence signals XCOM. The coincidence signal XCOM is then supplied to one input end of the AND gate 435.

The same operation as in the circuit 430 is performed in the circuit 431. Every time the counts of the counter 426 reach "4, 9, 13, 18, 22, 27, . . .", the comparator 425 supplies the signal YCOM to the other input end of the AND gate 435. When the signals XCOM and YCOM are supplied to the AND gate 435, an output from the AND gate 435 is supplied to the the clock input end of the flip-flop 434. When the output $\phi_{I,J}$ exceeds the output level of the slice level generator 433, the comparator 432 supplies the output to the D input end of the flip-flop 434. The output $Q_{I,J}$ corresponding to the black dot is produced by the flip-flop 434, as shown in FIG. 12.

In the magnification mode, data of magnification ratio "0.5" is supplied from the CPU 2 to the adders 416, 417, 421 and 422. In this case, $Q_{I,J}$ is twice $P_{i,j}$, so that the picture information can be enlarged two times.

FIG. 13 shows the arrangement of the display interface 15. A refresh memory 60 has a memory area of 1024 bits (X-axis)×1400 lines (Y-axis). The CRT display 16 has a display area corresponding to a memory area of 1024 bits × 700 lines. A first 16-bit register 61 supplies in units of 16 bits picture information reduced by the size converting circuit 14 and supplied to the refresh memory 60. A first selector 62 selects the output from the 16-bit register 61 or pattern information from the pattern generator 6. A writing address counter 63 temporarily stores a writing start address from the CPU 2 and counts it up in response to clock pulses supplied from an AND gate 65 which are produced by counting down in the ratio of 1/16 the clock pulses from the size converting circuit 14 (flip-flop 434) through a 1/16 counter 64. The writing address counter 63 then designates addresses in the X- and Y-axes of the refresh memory 60. When picture information is written, the writing address counter 63 receives a pattern information writing address corresponding to a specific area at the lower right portion of the refresh memory 60 from the CPU 2. In this case, a signal of logic level "0" is supplied from the CPU 2 to the other input end of the AND gate 65, thereby disabling the supply of the clock pulse to the writing address counter 63. A CRT controller 66 comprises a counter 67, an address register 68 and a 700-line detector 69. The CRT controller 66 accesses addresses along the X- and Y-axes of the refresh memory 60. The counter 67 comprises a 1/64 counter 67a for counting clock pulses supplied from a generator 70 through a 1/16 counter 71, and a counter 67b for counting a carry of the counter 67a. The counter 67 uses a count of the counter 67a as an address along the X-axis (to be referred to as an X address hereinafter) and a count of the counter 67b as an address along the Y-axis (to be referred to as a Y address hereinafter). Furthermore, the address register 68 stores the reading start address (line address) from the CPU 2. The 700-line detector 69 detects whether or not the count of the counter 67b has reached "700". When the count of the counter 67b reaches "700", the 700-line detector 69 allows the counter 67b to set the start address of the address register 68 therein. In the reading and writing modes, a second selector 72 selects the Y address of the writing address counter 63 or the Y address of the counter 67b. In the reading and writing modes, a third selector 73 selects the X address of the writing address counter 63 or the X address of the counter 67a. A second 16-bit register 74 serially supplies 16-bit picture information from the refresh memory 60 in response to clock pulses from the generator 70. A cursor locating circuit 80 receives a horizontal sync signal Hsync and a vertical sync signal Vsync in synchronism with the clock pulse from the generator and produces a cursor video signal corresponding to a predetermined cursor (frame). The cursor video signal from the cursor locating circuit 80 and the video signal from the 16-bit register 74 are supplied to the CRT display 16 through an OR circuit 200.

Figure 14:
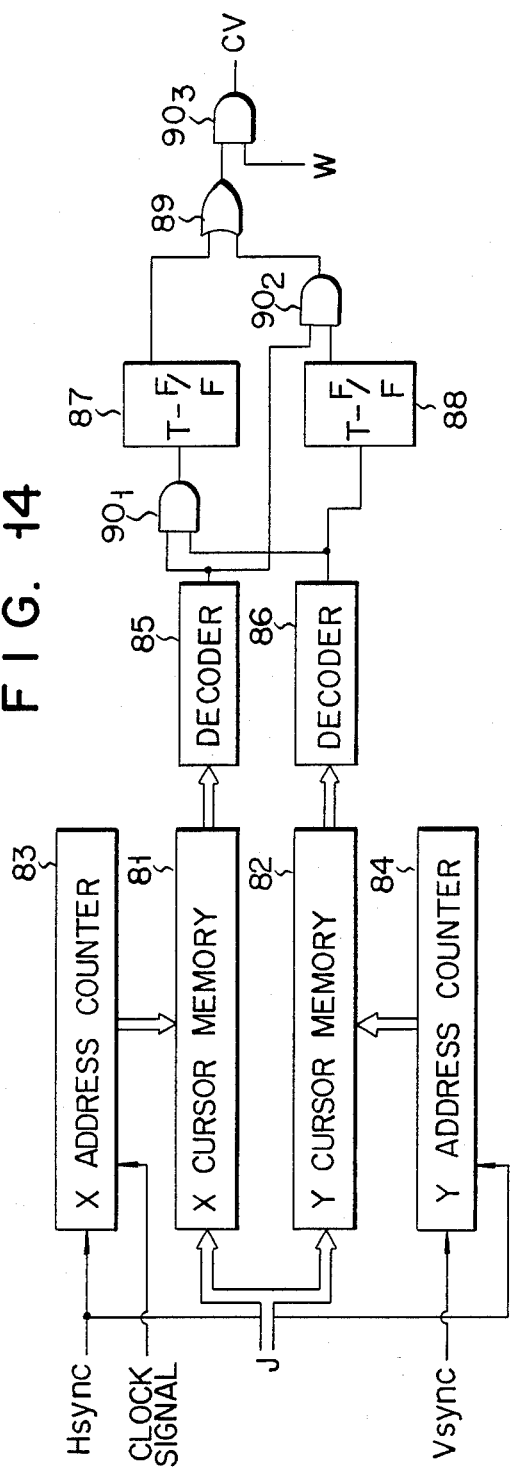
FIG. 14 is a block diagram showing an arrangement of the cursor locating circuit shown in FIG. 13.
Figure 16:
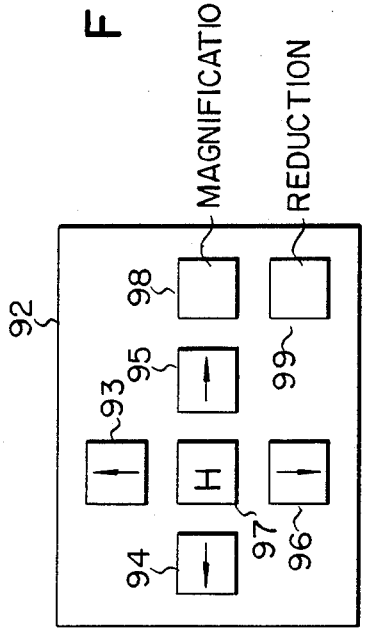
FIG. 16 is a view showing cursor keys arranged on a keyboard shown in FIG. 3.

FIG. 14 is a block diagram showing the arrangement of the cursor locating circuit 80. Referring to FIG. 14, an X cursor memory 81 stores position data of the right and left sides of the cursor in accordance with writing code data J from the CPU 2. A Y cursor memory 82 stores position data of the upper and lower sides of the cursor in accordance with the writing code data J from the CPU 2. An X address counter 83 counts the clock signal shown in FIG. 15A which is supplied from the generator 70. A Y address counter 84 counts the horizontal sync signal Hsync from the CRT controller 66, as shown in FIG. 15B. An X decoder 85 produces a signal of logic level "1" shown in FIG. 15C when the count of the counter 83 corresponds to the position data of the right and left sides of the cursor. A Y decoder 86 produces a signal of logic level "1" shown in FIG. 15D when the count of the counter 84 corresponds to the position data of the upper and lower sides. T flip-flops 87 and 88 produce signals shown in FIGS. 15F and 15G, respectively. An OR gate 89 produces a signal shown in FIG. 15I. Reference numerals $90_1$, $90_2$, $90_3$ denote AND gates, respectively. The AND gates $90_1$ and $90_2$ produces signals shown in FIGS. 15E and 15H, respectively. Referring to FIG. 14, reference symbol W denotes a blinking signal; and CV, a cursor video signal. Referring to FIG. 16, cursor keys 92 are arranged on the keyboard 10. When the operator selectively continues to press first to fourth ("up", "left", "right" and "down") motion or shift keys 93, 94, 95 and 96, shift pulses are generated from the keys and the CPU detects the pulses to generate control signals so as to move a picture image or a cursor in a direction directed by the pressed key. A fifth shift key 97 is used to move the display area on the CRT display 16 corresponding to the picture information in the refresh memory 60 to the upper left end portion. Reference numeral 98 denotes a size magnification key; and 99, a size reduction key.

The display operation of the apparatus having the configuration described above will be described hereinafter.

Figure 17:
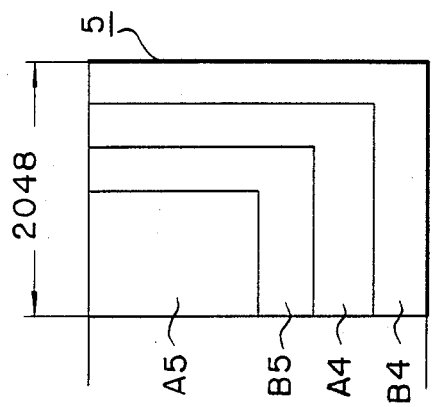
FIG. 17 is a view showing the storage condition of each original size data in the page buffer memory.

When the operator places the original 8 in the two-dimensional scanning device 7, a picture image on the original 8 is scanned, and at the same time the original size is detected. The readout picture image is stored in the page buffer memory 5 in accordance with the size of the picture information, as shown in FIG. 17. If the original size is a B4 size, the CPU 2 sets the reduction ratio of the size converting circuit 14 to be 1/4. If the original 8 has an A4 size, the reduction ratio is set to be 1/3.3. If the original 8 has a B5 size, the reduction ratio is 1/2.7. If the original 8 has an A5 size, the reduction ratio is 1/2. The picture information whose data is stored in the page buffer 5 is reduced by the size converting circuit 14 and is stored in the refresh memory 60. When the picture information is stored in the refresh memory 60, the CPU 2 reads out character pattern data, corresponding to the original size of the picture information from the pattern generator 6 and additionally stores it in the specific area of the picture information in the refresh memory 60. Therefore, as shown in FIGS. 18A to 18D, the picture information as a whole can be displayed with a constant size at the CRT display 16 regardless of the original size, thus allowing effective use of the display area of the CRT display 16. In this case, since the original size is displayed at the lower right portion on the screen, the operator can easily confirm the original size. If the page buffer memory 5 and the refresh memory 60 are used such that the long sides of the original 8 are aligned with the upper and lower sides of the screen, the picture image is displayed to cover entire area of the display screen at the CRT display 16, as shown in FIGS. 19A to 19D, thus maximizing use of the display area.

Figure 20:
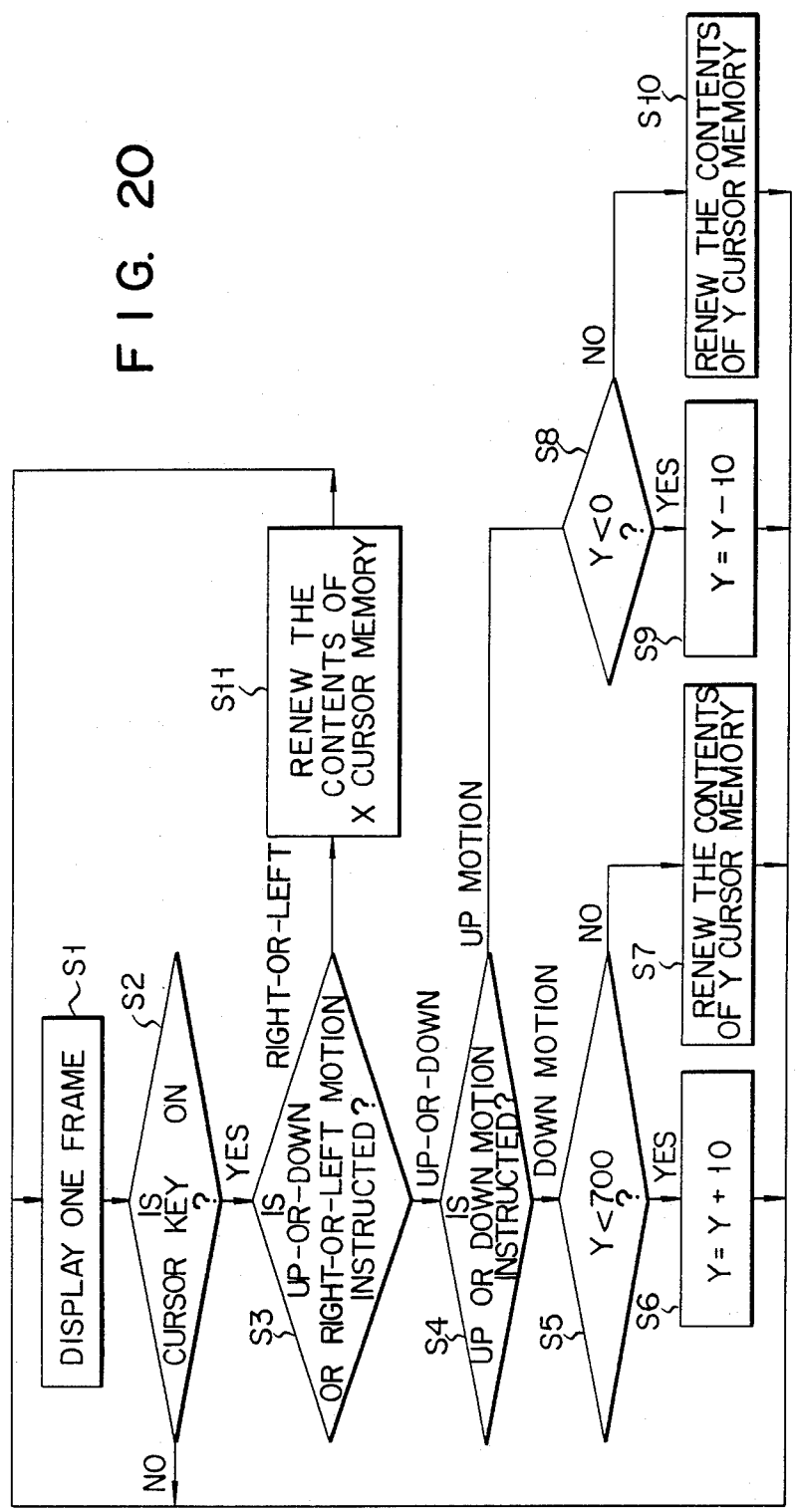
FIG. 20 is a flow chart for explaining the mode of operation of a CPU shown in FIG. 4.
Figure 21:
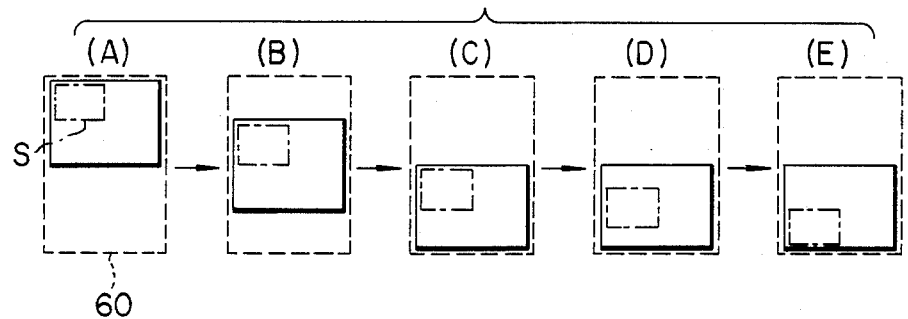
FIGS. 21A to 21E, FIGS. 22A to 22E and FIGS. 23 and 24 are views for explaining the display operation in accordance with the flow chart of FIG. 20.

Since the reductive ratio is slightly decreased to use the entire display screen, resolution of the image may be slightly degraded. In order to solve this problem, the operator performs a predetermined operation at the keyboard 10. The picture information having the B4 size is reduced with a reductive ratio of 1/2; the picture information having the A4 size is reduced with a reductive ratio of 1/1.7; the picture information having the B5 size is reduced with a reductive ratio of 1/1.3; and the picture information having the A5 size is reduced with a reductive ratio of 1/1. These pieces of data corresponding to the above picture information are stored in the refresh memory 60. The CPU 2 then performs an operation as shown in the flow chart in FIG. 20. Data of logic level "1" is set in the address register 68 of the CRT controller 66. Pieces of data from the first line to the 700th line which correspond to one frame are read out, and the corresponding picture information is displayed at the CRT display 16 (step S1). As shown in FIG. 21A, the picture information corresponding to the upper half portion (indicated by the solid line) of the memory area of the refresh memory 60 is displayed. The CPU 2 sets the address of a cursor S in the cursor location circuit 80, as indicated by the alternate long and short dashed line, as shown in FIG. 21A. The cursor S is then displayed at the CRT display 16. In this condition, when the operator presses the "down" shift key 96 (steps S2, S3, S4, and S5), the CPU 2 causes the address register 68 to increase its storage content by +10 (step S6). Every time the operator presses the "down" shift key 96, the display area of the picture information whose data is stored in the refresh memory 60 is gradually shifted downward, as shown in FIGS. 21B and 21C. In this case, the positional relationship between the display area and the cursor S is not changed. Thereafter, when the Y start address reaches "700" (step S5), the CPU 2 updates the Y address of the cursor S of the cursor location circuit 80 every time the operator presses the "down"shift key 96 (step S7). In this manner, every time the operator presses the "down" shift key 96, the cursor S is shifted downward, as shown in FIGS. 21D and 21E.

Figure 22:
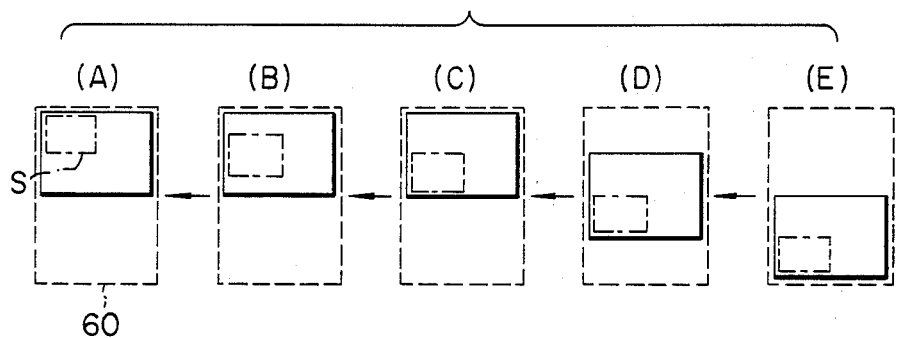
Figure 23:
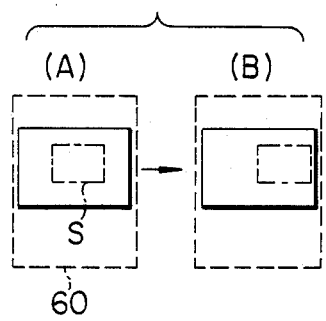
Figure 24:
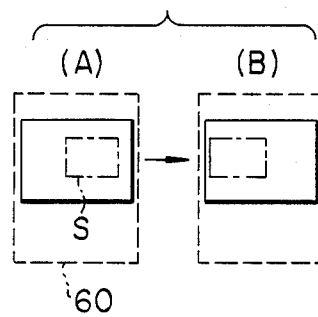

In this condition, when the operator repeatedly presses the "up" shift key 93 (steps S2, S3, S4 and S8), the display area is shifted upward (step S9), as shown in FIGS. 22E to 22C. Thereafter, the cursor S is shifted upward (steps S8 and S10), as shown in FIGS. 22B and 22A. When the operator presses the "right" shift key 95 in the condition shown in FIG. 23A (steps S2 and S3), a further shift area is not provided, so that the cursor S is shifted to the right and the display condition shown in FIG. 23B is obtained (step S11). When the operator further presses the "left" shift key 94 (steps S2 and S3) in the condition shown in FIG. 24A, only the cursor S is shifted to the left and the display condition shown in FIG. 24B is obtained (step S11). In this display condition, when the operator presses the size magnification key 98, the picture information within the cursor S is magnified and displayed. Thereafter, when the operator presses the size reduction key 99, the previous display condition is restored.

Since a given area is shifted in accordance with the picture information from the refresh memory 60, the picture information in the given area can be immediately displayed. As a result, data need not be read out from the page buffer memory unlike the conventional configuration, thus greatly increasing the display speed. Furthermore, the shift is utilized to display picture information, so that the reductive ratio of the picture information may be determined in accordance with the storage capacity of the refresh memory 60. In other words, the reductive ratio is increased as compared with a case in which the reductive ratio is determined in accordance with the display capacity of the CRT display, thus improving the resolution and readability of the picture image. Furthermore, since the shift designation of the given area has a priority over the shift designation of the zoom-up area, only a single operating mechanism is required, resulting in convenience. in practice.

In the above embodiment, the shift designation of the given area has priority over that of the cursor. However, the priority may be reversed. The present invention is not limited to the particular embodiment. Various changes and modifications may be made within the spirit and scope of the present invention.

What is claimed is:

1. A picture information display device, comprising:
    display means for displaying picture information;
    scanning means for scanning the picture information on an original and detecting a size of the original;
    control circuit means connected to said scanning means and having a page buffer memory, said control circuit means being adapted to store the picture information in said page buffer memory, to determine a reductive ratio of the picture information read out from said page buffer memory in accordance with a relationship between a detected size of the original and a size of a display area, and to produce control signals;
    size reduction circuit means connected to said control circuit means, for reducing, in accordance with the reductive ratio, a size of the picture information read out from said page buffer memory; and
    display interface means connected to said size reduction circuit means and having a refresh memory for storing size-reduced picture information which corresponds to at least one page of the original, said display interface means being adapted to store the size-reduced picture information in said refresh memory, and to produce a display signal to said display means in accordance with a storage content of said refresh memory, whereby said display means displays with a constant size regardless of the original size the picture information which is produced by reducing the contents of said page buffer memory.

2. A device according to claim 1, wherein the reductive ratio is a value to display the picture information stored in said refresh memory with a constant size on the display area of said display means.

3. A device according to claim 1, wherein said size reduction circuit comprises:
    means, connected to said control circuit means, for storing local pieces of picture information;

a position determining circuit connected to said control circuit means, for determining a position of a dot of a size-reduced picture image, in accordance with the reductive ratio, along the X- and Y-axes of the picture information stored in said page buffer memory; and an arithmetic operation circuit, connected to said storing means and to said position determining circuit, for computing a distance between the dot of the size-reduced picture information and a corresponding dot of the picture information stored in said storing means and for determining a logical value of the dot of the size-reduced picture image in accordance with the distance between the dot of the size-reduced picture and the corresponding dot and logical values thereof.

4. A device according to claim 1, wherein said display means comprises means for displaying the original size information at a specified area of the display area.

5. A device according to claim 1,
wherein said refresh memory has a storage capacity for storing the picture information corresponding to at least one page of the size-reduced original, and
wherein said display interface means comprises in addition to said refresh memory:
a first address designating circuit connected to said refresh memory to designate addresses along the X- and Y-axes of said refresh memory so as to write the picture information;
a second address designating circuit connected to said refresh memory to designate addresses along the X- and Y-axes of said refresh memory so as to read out the picture information; and
a shift-register connected to said refresh memory to temporarily store readout picture information and to produce the readout picture information at a predetermined timing.

6. A device according to claim 5, wherein said second address designating circuit comprises:
a first address register for storing a Y address of said refresh memory which is supplied from said control circuit means;
an X address register for designating the X address of said refresh memory;
a Y address register connected to said X address register, to increase a count corresponding to the Y address so as to designate the Y address of said refresh memory when said X address register completes designating all addresses along the X-axis; and
a circuit connected to said Y address register to set a storage content of said first address register in said Y address register when said Y address register completes designating all addresses along the Y-axis.

7. A device according to claim 1, further comprising operating means, said operating means being adapted to designate a shift of a desired area within said refresh memory and to designate a shift of a zoom-up region at a desired position within the desired area such that one of a shift designation of the desired area and a shift designation of the zoom-up region has a priority over the other thereof in accordance with a relationship between a memory area of said refresh memory and the desired area specified within the memory area.

8. A device according to claim 7, wherein said display means displays the picture information corresponding to the desired area specified by said operating means and displays the zoom-up region specified within the desired area with a cursor.

9. A device according to claim 8, wherein
said refresh memory has a storage capacity for storing the picture information corresponding to at least one page of the size-reduced original; and
wherein said display interface means comprises
a first address designating circuit, connected to said refresh memory, for designating addresses along the X- and Y-axes of said refresh memory so as to write the picture information;
a second address designating circuit, connected to said refresh memory, for designating addresses along the X- and Y-axes of said refresh memory so as to read out the picture information;
a shift-register, connected to said refresh memory, for temporarily storing readout picture information and producing the readout picture information at a predetermined timing;
a cursor signal generator for generating a cursor signal to display the picture image with a cursor within the display area of said display means; and
a circuit, connected to said cursor signal generator and to said shift-register, for synthesizing the picture information read out from the shift-register with the cursor signal.

* * * * *

UNITED STATES PATENT AND TRADEMARK OFFICE
CERTIFICATE OF CORRECTION

PATENT NO. : 4,520,399
DATED : May 28, 1985
INVENTOR(S) : Kazuhiko IIDA

It is certified that error appears in the above-identified patent and that said Letters Patent is hereby corrected as shown below:

On the title page the name of the Assignee should read

-- [73] Assignee: Tokyo Shibaura Denki Kabushiki Kaisha, Kawasaki, Japan --.

Signed and Sealed this

Twenty-first Day of January 1986

[SEAL]

Attest:

DONALD J. QUIGG

Attesting Officer

Commissioner of Patents and Trademarks